United States Patent [19]

Haas

[11] Patent Number: 4,499,772

[45] Date of Patent: Feb. 19, 1985

[54] FLEXURAL SUPPORT MEMBER HAVING A HIGH RATIO OF LATERAL-TO-AXIAL STIFFNESS

[75] Inventor: Wendall M. B. Haas, Covina, Calif.

[73] Assignee: The United States of America as represented by the United States Department of Energy, Washington, D.C.

[21] Appl. No.: 507,189

[22] Filed: Jun. 23, 1983

[51] Int. Cl.³ .............................. F16F 1/32; F16F 1/34; G01M 7/00; B06B 1/04
[52] U.S. Cl. ........................................ 73/666; 267/160
[58] Field of Search ................ 73/666, 663; 367/183, 367/187; 267/160, 161

[56] References Cited

U.S. PATENT DOCUMENTS

| | | | |
|---|---|---|---|
| 2,396,519 | 3/1946 | Massa | 367/187 |
| 2,767,973 | 10/1956 | TerVeen et al. | 267/161 |
| 3,123,728 | 3/1967 | Kreiskorte | 73/666 |
| 3,811,665 | 5/1974 | Seelig | 267/160 |

Primary Examiner—Howard A. Birmiel
Attorney, Agent, or Firm—David E. Breedon; Stephen D. Hamel

[57] ABSTRACT

A convoluted flexible support structure is provided which is capable of supplying a lateral to axial spring rate in excess of 1,000 to 1. A support member in the form of a steel disc having a specified number of rather large radius, concentric convolutions and a thickness in the range of from about 0.01 to 0.02 inch has an axial stiffness of about 50 pounds/inch while the lateral stiffness is about 100,000 pounds/inch. The support member may be used to support a vibration device where the lateral motion of the vibrator must be highly restricted while providing relatively free axial displacement of about ±0.25 inch.

3 Claims, 5 Drawing Figures

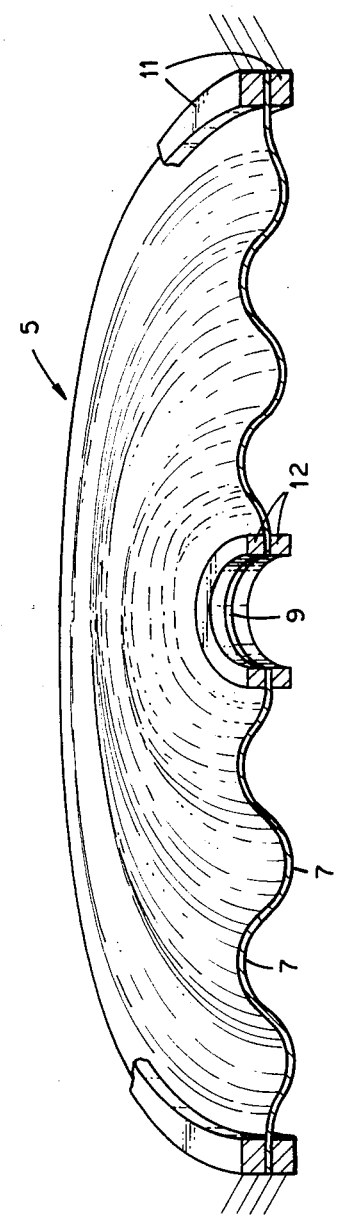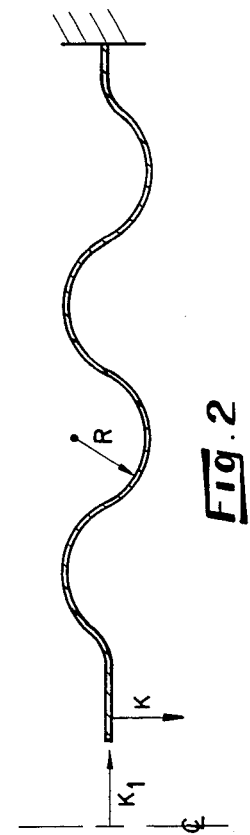

FLEXURAL SUPPORT MEMBER HAVING A HIGH RATIO OF LATERAL-TO-AXIAL STIFFNESS

BACKGROUND OF THE INVENTION

This invention is a result of a contract with the U.S. Department of Energy.

This invention relates generally to flexible support members and more specifically to a flexible support member having a very high lateral-to-axial spring rate ratio.

In the field of vibration testing, it is often necessary to vibrate, or shake, a member being tested along only one axis. This requirement places severe restraints on the mounting structure for the vibration drives. The requirements are relatively unrestricted axial movement of the drive and highly restrained lateral movement. Mounting structures in the past which provide the required lateral stiffness are also very stiff in the axial direction. This requires tremendous amounts of power to simply actuate the drives.

In the testing of lower suspension systems for a gas centrifuge, for example, there is a need for a vibration drive support structure capable of deflecting ±0.25 inch with a force of less than 50 pounds in an axial direction; and at the same time having a lateral spring rate of at least 100,000 pounds per inch. A circular structure is needed with a spring rate ratio radial to axial of 500 to 1 or greater.

SUMMARY OF THE INVENTION

In view of the above need, it is an object of this invention to provide a flexible support member having a high ratio of lateral-to-axial stiffness.

It is another object of this invention to provide a flexible support member of circular configuration which has a spring rate ratio radial to axial that is greater than 1,000 to 1.

Other objects and many of the attendant advantages of the present invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention as embodied and broadly described herein, the flexural support member of this invention may comprise a disc having a plurality of concentric convolutions each of a preselected radius and thickness so that when the disc is fixed about is periphery the center of said disc provides free reciprocal guided motion of a device attached to the center of the disc along an axis perpendicular to the disc while substantially restraining motion of said device perpendicular to the axis.

A pair of the support members may be used to support the driver element of a shaker to provide shaker motion which is restricted to one axis.

BRIEF DESCRIPTION OF THE DRAWINGS

FIG. 1 is a perspective view of a corrugated flexible support disc according to the present invention. The radius of the convolutions have been exaggerated in order to properly illustrate the disc.

FIG. 2 is a radius cross section of the disc of FIG. 1.

DETAILED DESCRIPTION

Figure 3:
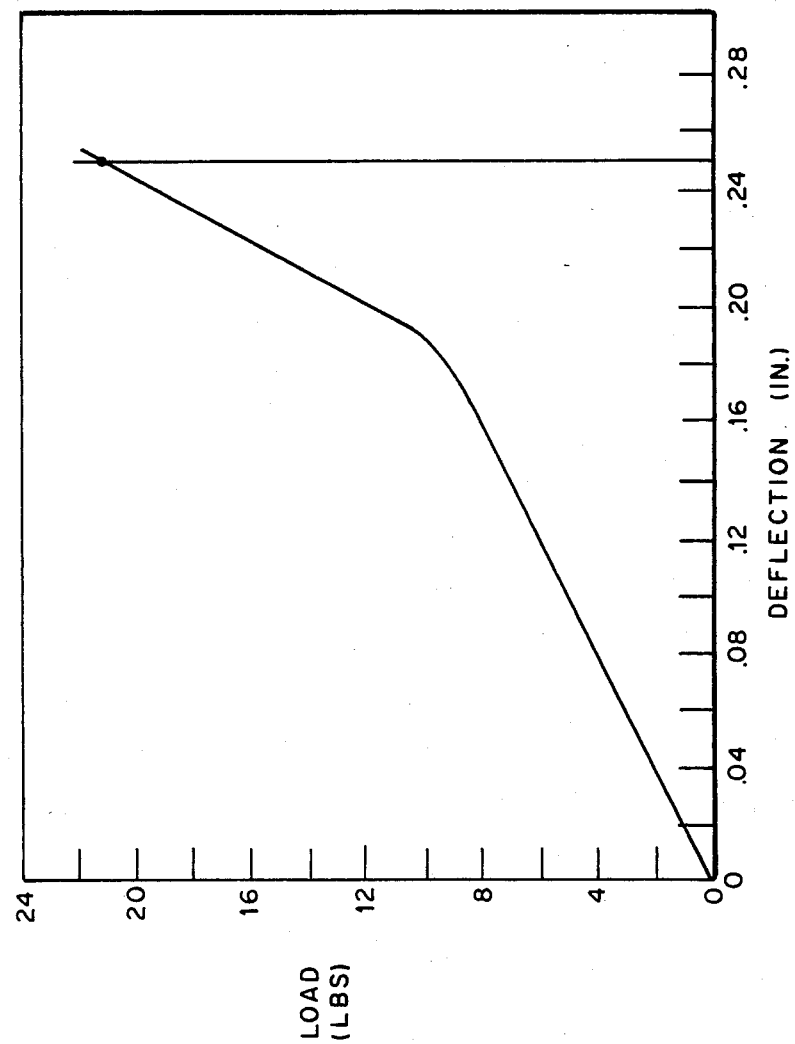
FIG. 3 is a graph illustrating the axial stiffness of the structure of FIGS. 1 and 2.

Referring to FIGS. 1 and 2, there is shown a flexible support structure according to the present invention. The structure includes a stainless steel disc 5 having a plurality, in this case four, concentric convolutions 7 formed by stamping between precision dies. The dies may include a deep convolution beyond the OD of the disc to avoid wrinkles. The central hole 9 is cut after the stamping operation. The structure includes reinforcement members, 11 and 12, which in turn must have a good shear bond to the disc. These reinforcement members must be so designed as to withstand buckling from the circumferential column action caused by the tension field in the disc.

The disc may be made from various other materials such as Beryllium, Beryllium-Copper, Aluminum or Composite. A primary requirement of the material from which the disc is constructed is formability, and high tensile and fatigue strength. What is required is a material that can function as a membrane in a high tension field with a reasonable life.

The disc illustrated has a central opening 9 so that it may be fitted onto the shaft of a shaker, for example, as will be described hereinbelow. The periphery of the disc may be fixed by the cylindrical clamping mount 11. The radius R of the convolutions are relatively large. During experimentation, it was found that the convolution radius for a 4-inch disc having four convolutions and a thickness in the range of from about 0.01 to 0.02 inch should be in the range of from 1 to 2.5 inches to provide am extremely high lateral-to-axial spring rate ratio, typically in the range of 1,000 to 1.

Figure 4:
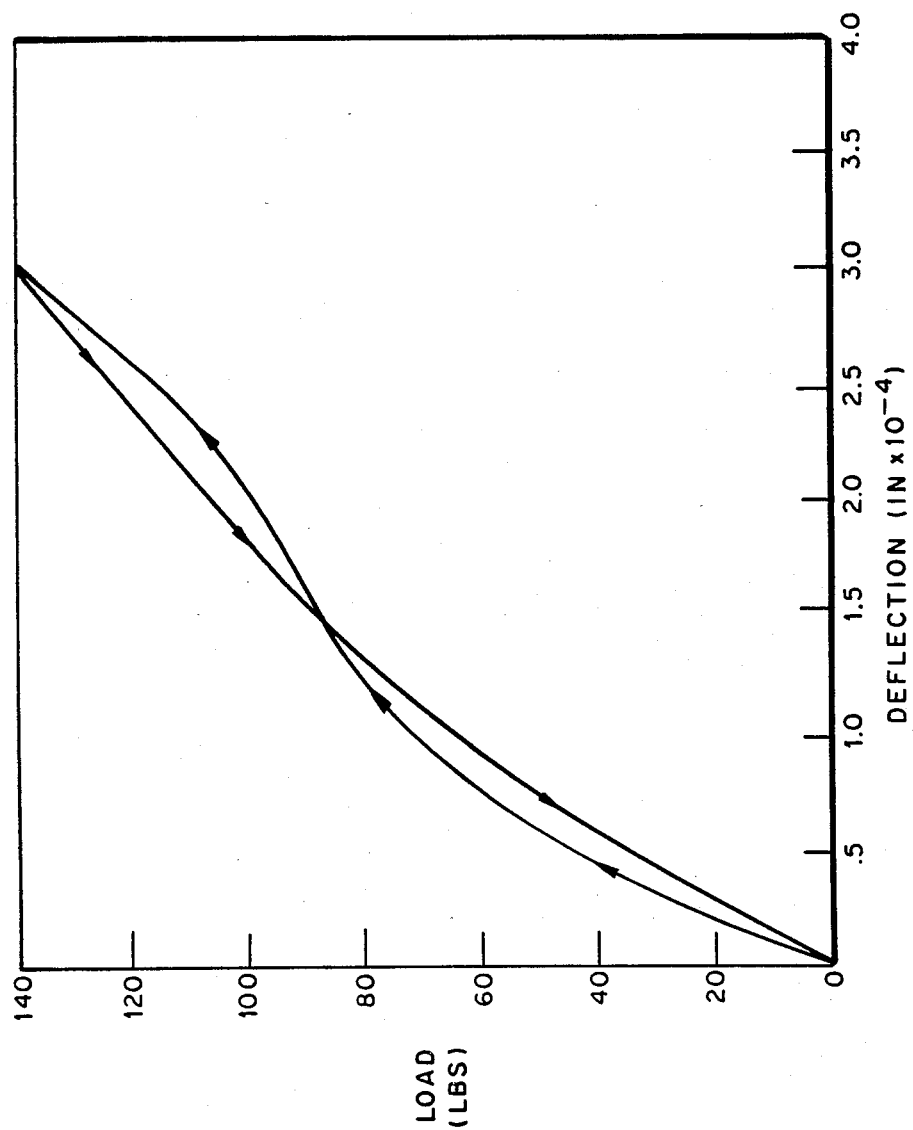
FIG. 4 is a graph illustrating the lateral stiffness of the structure of FIGS. 1 and 2.

The 4-inch diameter structure as shown in FIG. 1 having a thickness of 0.010±0.001 inch and a convolution radius of 1.47 to 1.75 inches was tested to establish the axial and lateral stiffness of the structure. Test results, which are shown in FIGS. 3 and 4, show that the maximum axial stiffness is 200 pounds/inch, within the ±0.25 inch deflection range, and the minimum lateral stiffness is 300,000 pounds/inch. This provides a worst case lateral-to-axial spring rate ratio of greater than 1,000 to 1.

The structure was mounted axially and laterally with attention to achieve pure and perfect axial or lateral deflections respectively. In the axial stiffness test, the disc was mounted horizontally and weight was added to a weight platform attached to the center opening of the disc. The weights were added in increments of about one pound and the axial defletion of the disc at the center was carefully measured after each weight. The results of this test are shown in FIG. 3. The axial stiffness (K), which is the slope of the line, ranged from 51.3 pounds/inch at start of loading to 200 pounds/inch at the end with an average of 126 pounds/inch.

To measure the lateral stiffness ($K_1$), the disc was mounted horizontally in a test rig having a yoke attached to the central opening in a balanced arrangement so that as force was applied laterally to the yoke the center of the disc remained aligned with the plane of the fixed outer ring of the disc. The force was applied to the yoke by means of a cable which extended over a pulley to a vertically suspended weight platform. Weights were loaded onto the platform in increments of 20 pounds and the deflection of the center of the disc was carefully measured for each weight addition up to 140 pounds. The weights were then removed in the same increments (20pounds) and the deflection measured for each reduction in weight until all the weights were removed. FIG. 4 shows the results of this loading and unloading cycle. The lateral stiffness ranged from 769,000 pounds/inch at the start of loading to 333,000 pounds/inch at the maximum loading with an average of 551,000 pounds/inch.

FIGS. 3 and 4 shows that in both cases there is a shift in stiffness. Axially the diaphragm becomes stiffer, and laterally the diaphragm becomes softer, both due to changes in its geometrical configuration during deflection. However, it will be seen that for application such as a support member for short axial deflections, within ±0.25 inch, the disc provides an excellent support structure for producing pure axial motion.

Figure 5:
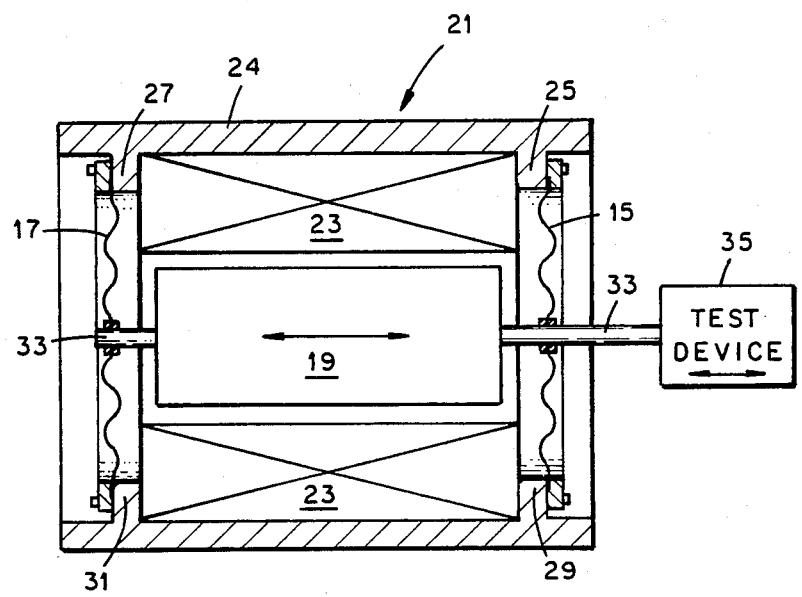
FIG. 5 is a cross-sectional view of a shaker employing a pair of flexible support members made in accordance with the present invention.

As shown in FIG. 5, a pair of flexible support discs 15 and 17 may be used to support the armature 19 of an electromagnetic shaker 21. The armature is driven by an electromagnet coil arrangement 23 mounted in a support housing 24. The support discs 15 and 17 may be fixed at their periphery by means of clamping the outer flat portion of each disc between flanges 25 and 27 of the housing and corresponding clamping rings 29 and 31, respectively, which may be bolted into the flanges to secure the supports. The center of each disc is secured to a central shaft 33 of the armature. The shaft may be coupled to a test device 35, or other objects, which are to be vibrated along the axis of the armature by the reciprocating motion of the armature. The mounts 15 and 17 prevent lateral movement of the armature, thereby providing a purely axial displacement of the test device 35.

Thus, it will be seen that a flexible mount structure has been provided for mechanically mounting various devices where limited free movement along one axis desired while highly restraining movement perpendicular to the one axis. The foregoing description of one embodiment of the invention has been presented for purposes of illustration and description. It is not intended to be exhaustive or to limit the invention to the precise form disclosed and obviously many modifications and variations are possible in light of the above teaching. The embodiment was chosen and described in order to best explain the principles of the invention and its practical applications to thereby enable others skilled in the art to best utilize the invention in various embodiments and with various modifications as are suited to the particular use contemplated. It is intended that the scope of the invention be defined by the claims appended hereto.

What is claimed is:

1. A flexible support member for controlling reciprocating motion of a device along an axis perpendicular to the plane of said flexible support member, comprising:
   a disc formed of a metal having the properties of high tensile and fatigue strength, a thickness in the range of from about 0.01 to 0.025 inch and a plurality of concentric convolutions each having a radius in the range of from about 1 to 2.5 inches to provide a lateral-to-axial stiffness ratio greater than 1,000 to 1, said disc being mounted about its periphery and attached to said device at its center along an axis of motion perpendicular to the plane of said disc to provide free reciprocal motion of said device along said axis while substantially restraining motion of said device perpendicular to said axis.

2. The support member as set forth in claim 1 wherein said disc is formed of stainless steel.

3. In combination with a shaker device wherein a drive member including a shaft which is reciprocatably driven along an axis, a flexible support structure for mounting said drive member of said shaker device comprising:
   first and second annular discs concentrically attached to said shaft of said drive member at spaced locations along said shaft fixedly mounted at their periphery so that said drive member is supported to move along said axis perpendicular to the plane of said first and second discs, each of said discs formed of a metal having the properties of high tensile and fatigue strength, a thickness in the range of from about 0.01 to 0.025 inch and a plurality of concentric convolutions each having a radius in the range of from about 1 to 2.5 inches to provide a lateral-to-axial stiffness ratio greater than 1,000 to 1 to provide free reciprocal motion of said drive member along said axis while substantially restraining motion of said drive member perpendicular to said axis.

* * * * *